May 18, 1965  F. FARKAS  3,183,552

PLASTIC MOLDING APPARATUS

Filed Jan. 25, 1963  8 Sheets-Sheet 1

FIG. 1

INVENTOR.
FRANCIS FARKAS
BY *Douglas S. Johns*

Attorney

INVENTOR.
FRANCIS FARKAS
BY *Douglas S. Johns*

Attorney

INVENTOR.
FRANCIS FARKAS

INVENTOR.
FRANCIS FARKAS
BY Douglas S. John
Attorney

May 18, 1965 F. FARKAS 3,183,552
PLASTIC MOLDING APPARATUS
Filed Jan. 25, 1963 8 Sheets-Sheet 8

FIG. 16

INVENTOR.
FRANCIS FARKAS
BY Douglas S. John

Attorney

United States Patent Office 3,183,552
Patented May 18, 1965

3,183,552
PLASTIC MOLDING APPARATUS
Francis Farkas, Willowdale, Ontario, Canada, assignor to Canada Lighter & Plastics Limited, Willowdale, Ontario, Canada
Filed Jan. 25, 1963, Ser. No. 253,964
10 Claims. (Cl. 18—5)

This invention relates to apparatus for forming hollow articles from thermoplastic materials, and in particular relates to the forming of containers with restricted neck openings.

Apparatus for so called "injection molding" of hollow articles, conventionally comprises a mold having axially separable half sections carried in a platen secured to a fixed base, and a device for delivering the fluid thermoplastic material through the platen into the cavity of the mold; in line with the axis of this mold and mounted on a second platen is a plunger or core motivated by pressure means to enter into the mold, at which time the separable half sections close to form a cavity. The thermoplastic material is injected into the closed mold to fill the cavity and after release of pressure the halves of the mold separate axially from each other allowing withdrawal of the plunger which is surrounded by the article. On further withdrawal of the plunger pressure is applied to the article surrounding the core so that it is removed.

It will be clear that such apparatus is limited to the production of containers having unrestricted openings, and to produce articles with restricted openings, e.g. bottles, a method has been developed of first molding a preform or blank in a closed mold and then transferring the preform to a so called blow mold after which it is blown in the latter to the desired size of the article. Apparatus designed solely to carry out this method has been developed but its installation adds considerably to the capital cost of a plant where it is desired to produce a line of articles having both open and restricted necks.

It is an object of this invention to quickly and economically adapt an injection molding machine from the production of open neck containers to closed neck containers.

It is a further object of the machine, so adapted, to produce blanks from preform molds and then blow these blanks in blow molds to containers having restricted necks, at the same time producing a further set of blanks for subsequent transfer to the blow molds.

The invention provides apparatus for molding neck shaped articles from plastic materials which includes a first block carrying blank and blow mold sections in spaced relation with means in the first block to diverge these mold sections a pre-determined distance outwardly thereof. Parallel to the first block and movable away from same is a second block carrying the plungers, these latter being surrounded by neck mold split sections seated in the second block but mounted so they are capable of outward divergent movement therefrom. On application of pressure by one block against the other the mold sections close inwardly to surround the cores located in the blow molds and blank molds and after injection of the plastic material into the former with simultaneous introduction of pressurized air through the core in the latter, the release of pressure by the block and withdrawal of same permits the mold sections to automatically open. On further separation of the blocks the neck mold sections in line with the blow mold sections are opened by independent means to permit removal of the articles surrounding the plungers, after which the position of one block is moved in a plane substantially parallel in relation to the other to permit the plungers withdrawn from the blow molds to be aligned with the blank molds and the corresponding plungers with the preforms removed from the blank molds to be aligned with the blow molds.

The invention may be fully understood from the following detailed description with reference to the accompanying drawings:

Figure 1:
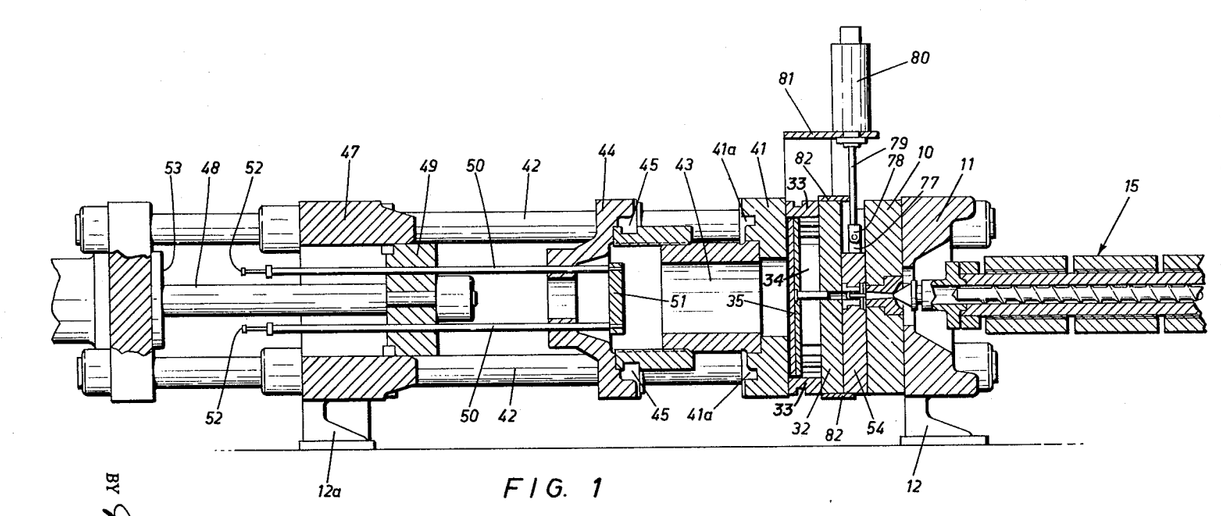
FIGURE 1 is an elevational view of an injection molding machine embodying the invention.

As shown particularly in FIGURE 1 a block 10 is clamped to a fixed platen 11 secured to a base 12 and disposed centrally through the block 10 is a bush 13 which has a channel 14 extending axially its whole length and communicating through an aperture in the fixed platen 11 with a pressure device 15 for supplying liquid thermoplastic material. The bush 13 is provided with a flange 16 seated in the block 10 to prevent movement as a consequence of the pressure exerted by the standard device 15.

Figure 2:
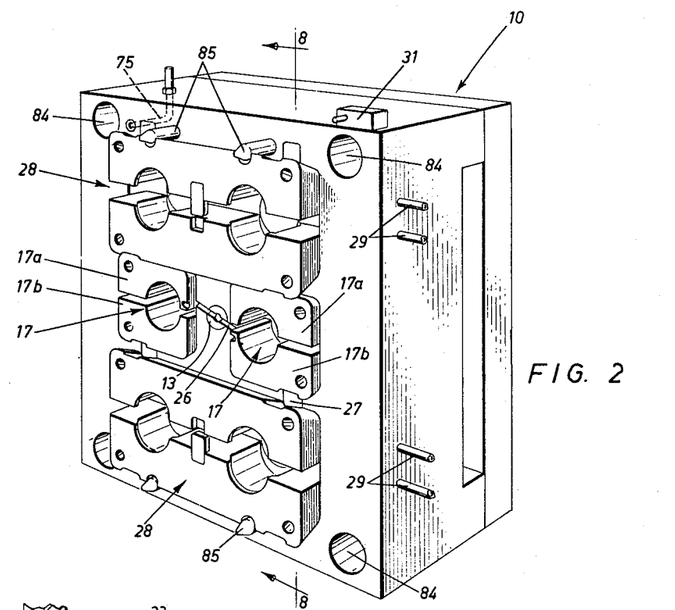
FIGURE 2 is a face view of the first block with the blow molds and blank molds in spaced relation.
Figure 8:
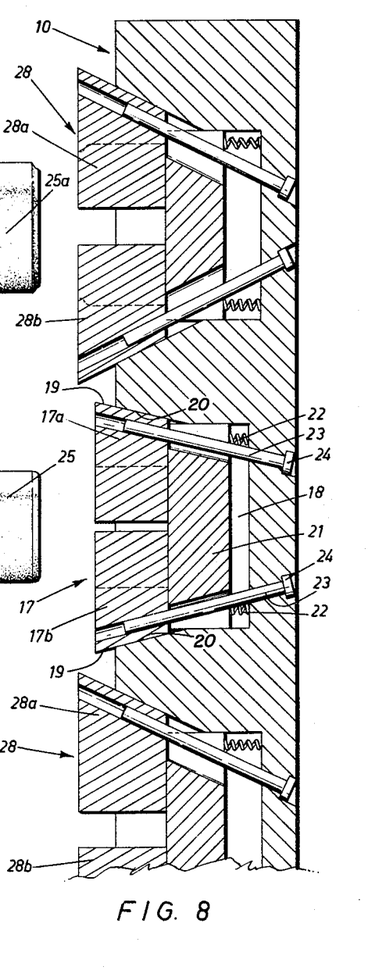
FIGURE 8 is an enlarged sectional view taken along the lines 8—8 of FIGURE 2.
Figure 9:
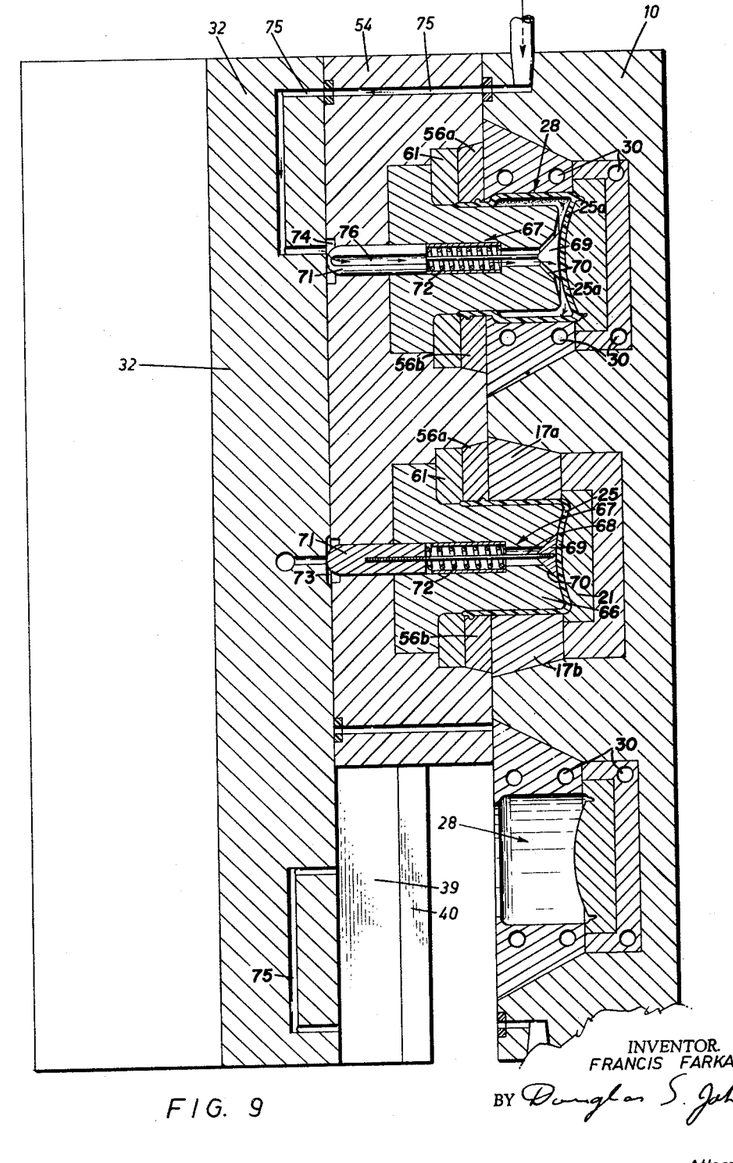
FIGURE 9 is a sectional view taken through the first and second blocks illustrating the arrangement when a blank and a finished article are simultaneously formed.

As shown in FIGURE 2 a blank mold cavity 17 is provided in the block 10, one on each side of the bush 13. Each blank mold cavity 17 comprises an upper and lower mold section 17a and 17b slidably receivable in recesses 18 in block 10 as shown in FIGURE 8. The mold sections 17a and 17b have inner parallel surfaces to define the mold cavity 17, but the outer surfaces 19 of the mold sections 17a and 17b are tapered inwardly towards each other, the inner surface 20 of the recesses 18 in the block 10 being similarly tapered. As shown in FIGURE 8 the seating of the mold cavity 17 is provided by a plate 21 which has the same dimension as the base of the tapered recesses 18 in the block 10. Bearing against the end wall of recesses 18 and urging the plate 21 outwards are compression springs 22. The mold sections 17a and 17b are carried by guide pins 23 aligned substantially parallel to the outer surfaces 19 of the mold sections 17a and 17b, and the plate 21 rides on the guide pins 23 in recesses provided in the upper and lower edges of the plate 21. The guide pins 23 are seated in the block 10 by means of heads 24. The springs 22 are dimensioned so that the mold sections 17a and 17b protrude from the surface of the block 10 to an extent whereby their divergent movement outwards permits the necessary opening of the mold cavities 17 for withdrawal of the blank 25 as shown in FIGURE 9. Capillary tubes 26 are provided in the block 10 to communicate with the channel 14 and deliver liquid thermoplastic material to the blank mold cavities 17. The upper and lower edges of the mold sections 17a and 17b bear on to bushings 27 attached to the surface of the block 10 and suitable recesses are provided in the mold sections 17a and 17b to mate with the bushings 27.

Above and below the blank mold cavities 17 are a pair of blow mold cavities 28 constructed in a manner identical to that described for the blank mold cavities 17, though it will be appreciated that they are larger in diameter to permit the necessary expansion of the blank 25 when it is being blown to the finished article 25a. Also since their location is not associated with a central supply of liquid thermoplastic material, it is convenient for the pair of sections 28a and 28b to define a pair of blow mold cavities 28. It is advisable to provide for cooling of the blow mold 28 and hence cooling tubes 29 communicate with suitable channels 30, shown in FIGURE 9, provided in the mold sections 28a and 28b, these channels 30 registering with the cooling tubes 29 when the mold sections 28a and 28b are fully closed. On the upper surface of the block 10 a microswitch 31 is provided which synchronizes the operation of the apparatus, this operation being described later.

Figures 5, 5A, 6:
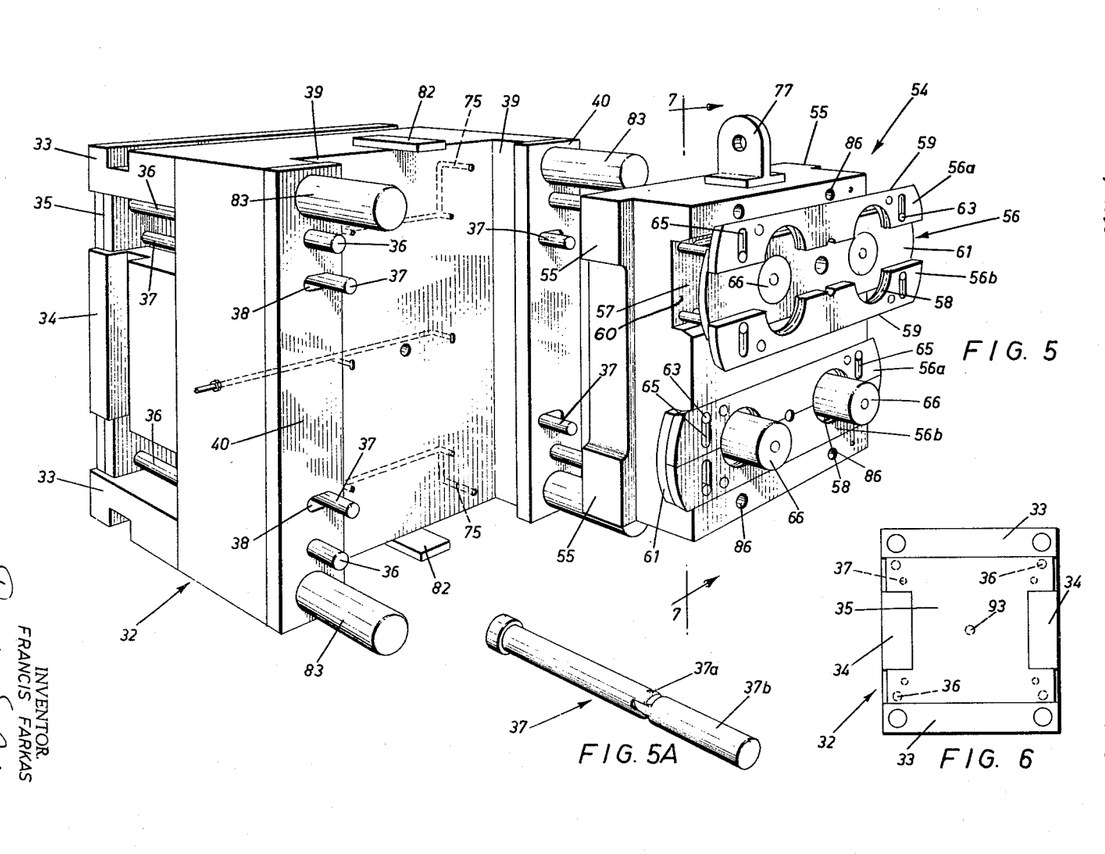
FIGURE 5 is a face view of the second block with open and closed neck mold sections and the housing for carrying this block.
FIGURE 5a shows the detail of the hinged pins located in the housing for opening the neck mold sections surrounding the plunger carrying the blown article.
FIGURE 6 is a view of the rear of the housing as shown in FIGURE 5.

Movable towards and away from the block 10 is a housing 32, shown in FIGURE 5, secured in the rear to horizontal members 33 and also to vertical members 34 which lie between the horizontal members 33 so as to define with them a cavity in the shape of a cruciform. A movable plate 35 is slidably receivable in this cruciform cavity, and secured adjacent to its corners are push back pins 36 which ride in the housing 32; adjacent and parallel to each of the push back pins 36 are pins 37 hinged intermediate of their ends at 37a as shown in FIGURE 5a to provide a forward part 37b. The pins 37 are secured to the surface of the housing 32 extending through vertical flanges 39 on each side of the housing 32, which are attached to plates 40. The channels 38 are flared at their front ends with a horizontal axis greater than the vertical axis, so as to permit lateral movement of the hinged forward part 37b when it is located in the flared portion of the channel 38.

As shown in FIGURE 1 by means of the horizontal members 33 and vertical members 34, the housing 32 is secured to a movable platen 41, having bushes 41a at its ends which surround parallel tie bars 42. Attached to the platen 41 and positioned between the tie bars 42, is a hollow cylindrical block 43 and bridging the tie bars 42, to the rear of the block 43, is a first member 44 into which the cylindrical block 43 is threaded so that their relative position can be adjusted. The bridge member 44 has bushings 45 slidable on the tie bars 42. Spaced at the rear is a second member 47 attached to a base 12a which also bridges the tie bars 42. Intermediate of the member 47 is a plunger 48 carrying at its forward end a member 49 slidable within member 47. A pair of parallel rods 50 positioned intermediate of the tie bars 42 slidably traverse the first bridge member 44 and the slidable member 49. The rods 50 are attached at their forward ends to a plate 51, and the opposite ends 52 of the rods 50 are provided with means to adjust their length. The plate 51 has a circumference slightly smaller than the bore of the hollow block 43, so that on retraction of the member 44 the plate 51 will enter the bore of the block 43. A link arm, not shown, connects the bridge member 44 to the sliding member 49 controlling the travel of the member 44. On further withdrawal of the bridge member 44 the ends 52 of the rods strike an end plate 53 restricting further travel and the plate 51 acts as a stop means.

As shown in FIGURE 5 the flanges 39 on the housing 32, together with the plates 40, provide a recess in which a block 54 slides by means of abutments 55 disposed on each side. Two pairs of neck mold cavities 56 are provided in the block 54, one pair being spaced from the other by a distance corresponding exactly to the distance between a blank mold cavity 17 and a blow mold cavity 28 positioned immediately above or below in the block 10. Each pair of neck mold cavities 56 are formed by upper and lower neck mold sections 56a and 56b slidably receivable in recesses 57 in the block 54. As shown in FIGURE 5 the upper and lower neck mold sections 56a and 56b will have inner threaded surfaces 58 to define the neck mold cavities 56 when it is desired to cast articles having screw-on tops, but the outer surfaces 59 of the neck mold sections 56a and 56b are tapered inwardly towards each other, the inner surfaces 60 of the recesses 57 in the block 54 being similarly tapered in angularity and depth. The bottom seatings of the neck mold cavities 56 are provided by plates 61, which have the same width as the base of the tapered recesses 57 in the block 54. The length of the plates 61 are such that their ends extend outwards beyond the vertical sides of the block 54, to a point where they intersect the longitudinal axis of the movable hinge pins 37; the combined thickness of a neck mold section 56a or 56b and the backing plate 61 is the same as the depth of the recesses 57.

Figure 7:
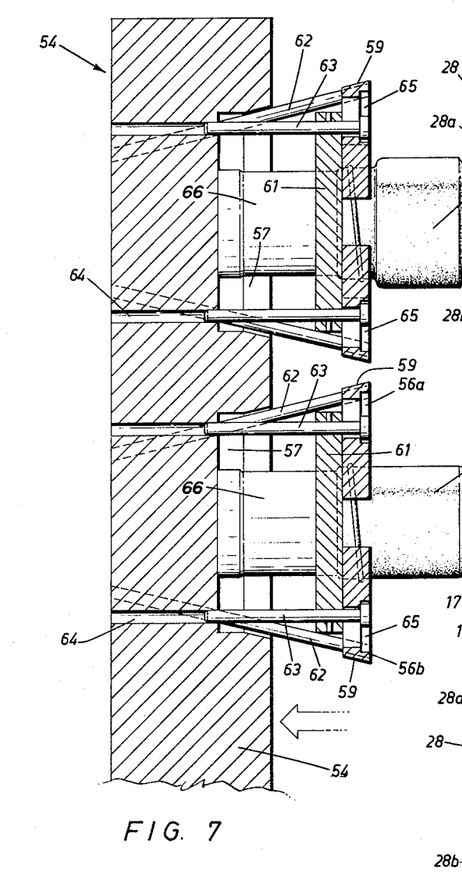
FIGURE 7 is an enlarged sectional view of the neck mold sections taken along the lines 7—7 of FIGURE 5.

As shown in FIGURE 7, guide pins 62 inwardly inclined with respect to the axis of the neck mold cavities 56 are attached to the upper and lower neck mold sections 56a and 56b, the plate 61 having recesses cut into its upper and lower edges through which the angular guide pins 62 travel. Another set of guide pins 63 also extending inwardly, but in a direction parallel to the axis of the neck mold cavities 56, are attached to the plate 61; both angular guide pins 62 and guide pins 63 ride in channels 64 provided in the block 54. The plate 61 is movable outwards in a direction normal to the block 54 and during such movement is in sliding contact with the neck mold sections 56a and 56b; the lateral movement of the neck mold sections 56a and 56b is utilized to limit the distance of their outward movement by extending the guide pins 63 through the plate 61 as far as the outer surface of the neck mold sections 56a and 56b, and providing slots 65 therein around the ends of the pins 63. It will be clear that the divergent outward movement of the neck mold sections 56a and 56b will be terminated when the guide pin 63 bears on to the side of the slot closest to the common edge of a pair of neck mold sections 56a and 56b.

Tubular plungers 66 projecting outwardly are secured at their base in the sliding block 54; the plunger 66 extends through the plate 61 and through the neck mold sections 56a and 56b when closed. Extending within the tubular plunger 66 is a valve assembly 67 comprising a rod 68 shown in FIGURE 9, which is of smaller cross section than the bore of the plunger 66 and having a head 69 at its free end shaped to fit into a seating 70 provided in the end of the plunger 66. The other end of the rod 68 is threaded on to a guide member 71 biased inwardly by a spring 72 so that during the injection operation in the blank mold cavity 17 the head 69 engages the seating 70 and prevents entry of the liquid plastic material into the plunger 66; to accommodate the requisite inward movement of the rod 68, a recess 73 of the requisite depth is provided in the housing 32 in line with the axis of the blank mold cavity 17. When the plunger 66 is positioned in the blow mold cavity 28, the guide member 71 rests in a shallower recess 74 provided in the housing 32 in line with the axis of the blow mold cavity 28 to bias the head 69 outwardly of the free end of the plunger 66. The tubular plungers 66 registering with the blow mold cavities 28, and seated in the shallower recesses 74, communicate through bores 75 provided in the housing 32 and the block 10 and block 54 to a source of pressurized air. The guide member 71 is provided with longitudinal grooves so as to permit the air to enter the blow mold cavity 28.

As shown in FIGURE 1 the block 54 slides in the housing 32 by means of a linkage comprising a bracket, secured to the upper part of the block 54, which is pinned to a shackle 78, to which is attached one end of a piston 79 actuated in known manner by fluid pressure in a cylinder 80 carried on a platform 81, which is attached to the upper part of the housing 32. The sliding movement of the block 54 is limited by bumper bars 82 attached to the upper and lower side of the housing 32 to ensure correct alignment of the plungers 66 with the blank mold cavities 17 and blow mold cavities 28. Furthermore, locating pins 83 are secured close to the corners of the housing 32 to mate with suitable recesses 84 provided in the block 10 and finally a further set of locating pins 85 are provided in the block 10 to mate with suitable recesses 86 in the block 54.

Figure 3:
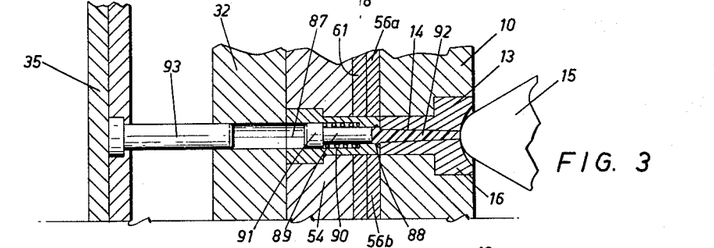
FIGURES 3 and 4 are enlarged sections as shown in FIGURE 1 illustrating the arrangement for removal of the solidified plastic left in the channel supplying the liquid plastic material to the blow mold.
Figure 4:
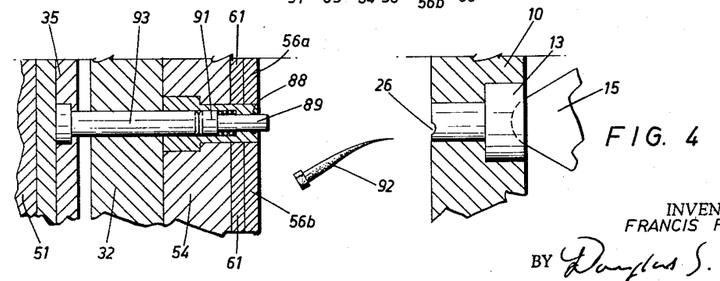

As shown in FIGURES 3 and 4 and orifice 87 centrally disposed at the junction of each of a pair of neck mold sections 56a and 56b and equidistant between a pair of neck mold cavities 56 extends through the plate 61, the block 54 and the housing 32; the orifice 87 has an annulus 88 close to the front surface of the block 54. A push out pin 89 having a slightly smaller cross section than the wall of the orifice 87 is located therein to the rear of a circular recess 88, the member 89 being biased inwardly by a spring 90 bearing against a head 91 on the end of the pins 89. It will be clear that dependent on the position of the block 54 either an upper or lower orifice 87 will be in line with the channel 14 and, as shown in FIGURE 3, when the block 10 and the block 54 meet liquid thermoplastic material travelling along the channel 14 will enter the orifice 87 to a point where its further progress is prevented by the member 89. On separation of the block 10 and block 54 the plastic retained by the annulus 88 will pull out the spru 92 from the end of the channel 14, thus ensuring that no overlap of material will take place on the face of the block 10 to prevent it mating properly with block 54 on subsequent contact. Attached centrally of the plate 35 is a second push out pin 93 in line with the channel 14; on forward movement of the plate 35 due to contact with the stop means plate 51 the push out pin 93 moves into the orifice 87 exerting pressure against the spring loaded push out pin 89 which will then move to eject the spru 92 as shown in FIGURE 4.

*Operation*

It will be clear that the spaced relation of the two horizontal recesses 57 in the block 54 being identical with the distance apart of a blank mold cavity 17 and a blow mold cavity 28 immediately above or below the block 10 results in a situation whereby the plungers 66 located in one of the two horizontal recesses 57 will be aligned with the blank mold cavity 17 and the plungers 66 in the other horizontal recess 57 will be aligned with either the upper or lower blow mold cavity 28, depending on the position of the sliding block 54, in the housing 32. Assuming that blanks 25 already on the plungers 66 are in a position to enter block 54, in the housing 32. Assume that the upper plungers 66 surrounded by the blanks 25 are aligned with the upper blow mold 28; hence the lower plungers 66 from which the articles 25a have been previously ejected are aligned with the blank mold 17. On movement of the block 54 towards the block 10 the neck mold sections 56a and 56b surrounding the lower plungers 66 bear against the split mold sections 17a and 17b; both the neck mold sections 56a and 56b and split mold sections 17a and 17b will close to completely form the blow mold cavity by the time contact is made between the faces of the blocks 54 and 10. At the same time the upper plungers 66 surrounded by the blanks will have entered the upper blow mold 28 and on completion of the movement of the blocks 54 and 10 the split mold sections 28a and 28b will have closed around the upper plungers 66 to form the blow mold cavity. On contact of the respective blocks 10 and 54 the microswitch 31 is tripped activating the pressure device 15 for ejecting liquid plastic material through the channel 14 and the capillary tubes 26 into the blank mold cavity 17, and also simultaneously activating the supply of pressurized air through the bores 75 into the upper set of tubular plungers 66 in the upper blow mold cavity 28.

Figure 10:
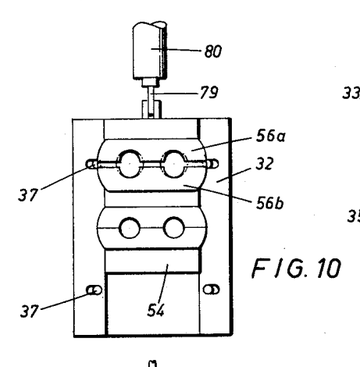
FIGURES 10, 11, 12 and 13 show the sequence of operations of the second block in the housing in one full cycle.
Figure 10A:
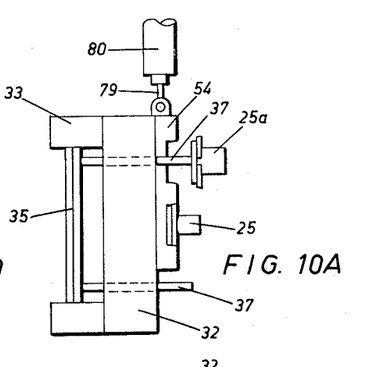
FIGURES 10a, 11a, 12a and 13a are side elevations showing further the sequence of operations illustrated by FIGURES 10, 11, 12 and 13.
Figure 11:
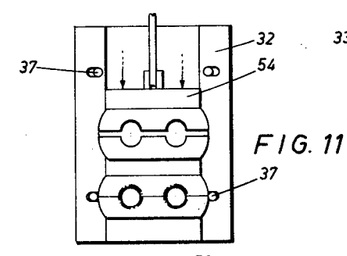
Figure 11A:
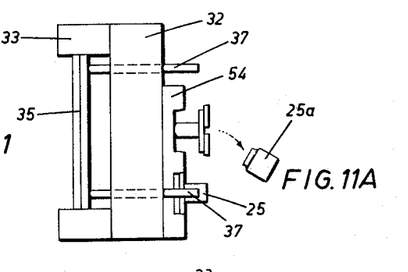
Figure 12:
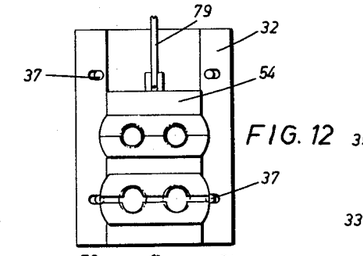
Figure 12A:
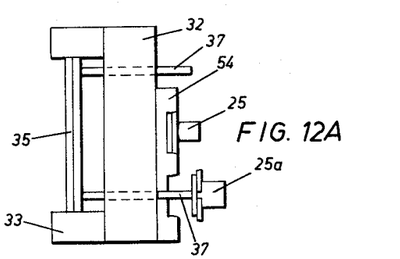
Figure 13:
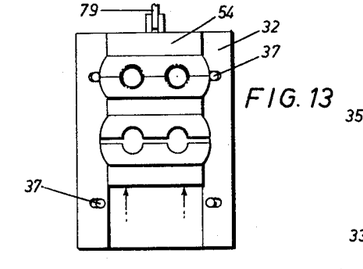
Figure 13A:
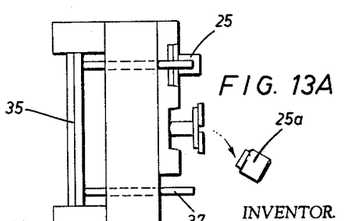

After a due period of time has elapsed the platen 41 starts to move backwards to the position shown in FIGURES 10 and 10a terminating the action of the microswitch 31. The split mold sections 17a and 17b move outwardly by means of the springs 22 to permit easy withdrawal of the lower plungers 66 each carrying a blank 25 whilst split mold sections 28a and 28b of the upper blow mold 28 move outwardly to permit withdrawal of the upper plungers 66 which carry the blown article 25. The platen 41 continues its movement backwards until the movable plate 35 strikes the stop plate 51 and on further movement of the platen 41 the hinged pins 37 move forward, the upper pair striking the ends of the plates 61 which extend outwards beyond the vertical side of the block 54. The neck mold sections 56a and 56b open outwards and forwards to release their hold on the article 25a and the plate 61 then strikes the rim of the article 25a to urge it along the plunger 66 sufficient to free the article 25a for it to fall away to a suitable container; at the same time the second push out pin 93, attached to the movable plate 35, has moved forward and applies pressure against the spring biased member 89 to eject the plastic spru 92 retained in the orifice 87. The housing 32 then commences its return travel and when the push back pins 36 contact the block 10, the plate 35 moves backward whereby the push out pin 93 clears the rear of the block 54 at which time the piston 79 actuated by the cylinder 80 and triggered by a suitable timing device, not shown, moves the block 54 downwards as shown in FIGURE 11. The split neck sections 56a and 56b surrounding the plungers 66 carrying the blank 25 are still closed, as shown in FIGURE 11, and they force the lower pair of hinged pins 37 apart so as to be left unaffected. The block 54 then strikes the lower bumper plate 82 on the housing 32 and the plungers 66 with the blanks 25 obtained from the blank mold cavities 17 are aligned with the lower blow mold cavity 28; the platen 41 then moves forward and the whole process is repeated.

Figure 14:
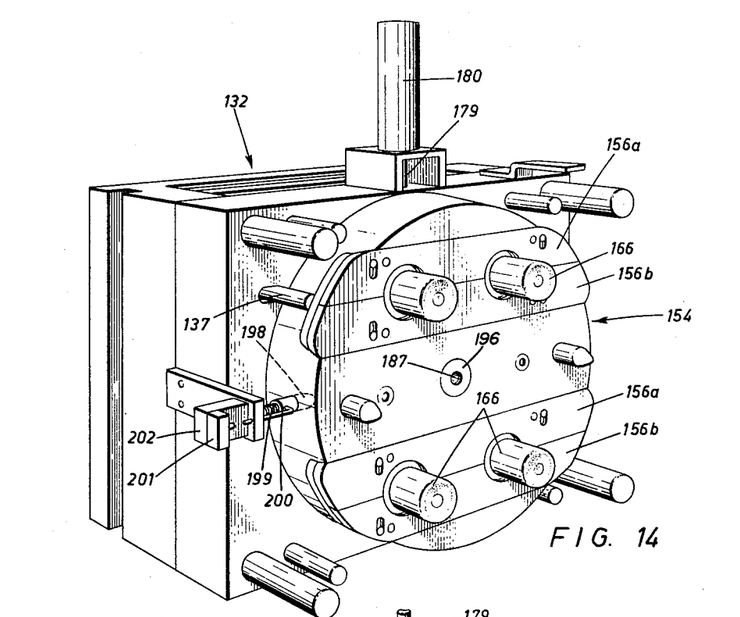
FIGURE 14 is an alternative embodiment of the invention wherein the second block carrying the neck mold sections is rotatable on the housing.
Figure 15:
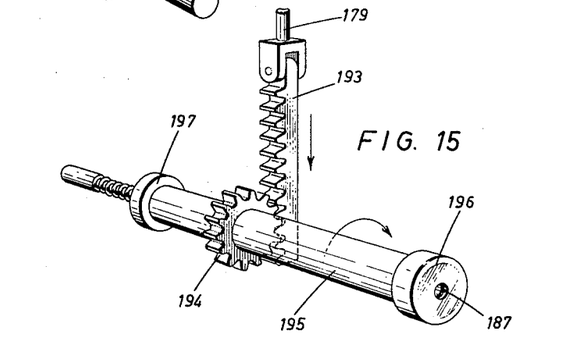
FIGURE 15 shows the linkage for rotating the second block.
Figure 16:
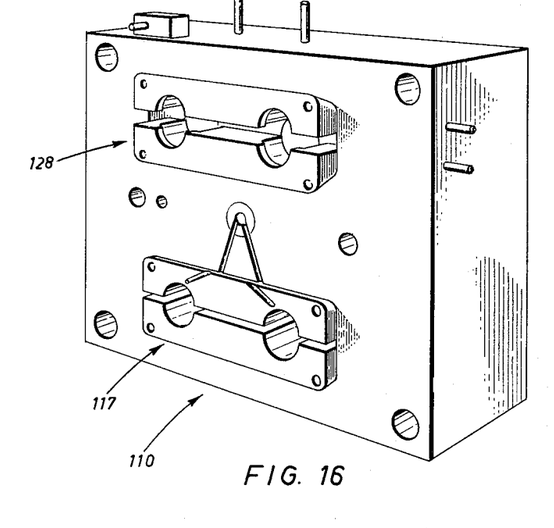
FIGURE 16 shows the arrangement of the spaced blanks and blow molds in a first block co-operating with a rotary second block.

In another embodiment of the invention as shown in FIGURES 14, 15 and 16 the sliding block 54 is replaced in the housing 132 by a block 154 rotatable through an angle of 180° about the central axis of the housing 132. Due to this rotary displacement it will be evident that the corresponding block 110, shown in FIGURE 16, only needs one blow mold station 128 to receive the plungers 166 removed from the blank mold station 117 and furthermore, it is only necessary to have one pair of hinge pins 137 for opening the neck mold sections 156a and 156b after their withdrawal from contact with the block 110. Finally, only one centrally placed orifice 187 is necessary in the face of the block 154.

The mechanism for rotating the block 154 on withdrawal of the plungers 166 is shown particularly in FIGURE 15. It comprises a vertical rack 193 disposed in the housing 132 connected to a piston 179 actuated by a cylinder 180 secured to the upper part of the housing 132. A gear 194 centrally disposed of the housing 132 co-operates with the rack 193 and axially disposed of the gear 194 and extending there-through is a shaft 195 one end of which carries a bushing 196, the outer face of which is flush with the face of the block 154 and the other end carries a head 197 which secures it to the rear face of the housing 132. Centrally disposed of the shaft 195 is the orifice 187 extending its whole length in which the spring loaded push out assembly, already described, is located.

At the side of the housing 132 a locking pin 198 extends inwardly to contact one or other of two suitable recesses provided at opposite sides of the block 154. This locking pin 198 is biased inwardly by means of a spring 199, and an arm 200 is secured to the pin 198 inwardly of the spring 199 leading to a microswitch 201 and solenoid 202 for moving the locking pin 198 outwardly of the block 154, thus freeing the shaft 195 for rotation.

From the foregoing description, it will be seen that the present invention provides a method and apparatus for the successful application of the injection method to the production of plastic containers having restricted openings. While certain embodiments have been illustrated and described for the purpose of disclosure, it will be understood that the invention is not limited thereto, but contemplates such modifications and other embodiments as may be utilized without departing from the invention.

I claim:

1. Apparatus for blow molding articles having necks comprising; a first block and a second block mounted in an opposed spaced apart parallel relationship; said first block including at least a first blow mold and a second blank mold, mounted therein in a spaced apart relationship, said blank mold and said blow mold each comprising separable sections biased to project in open positions outward of said block and slidable into closed positions flush with said block, said second block having mounted thereon first and second fixed plungers, one individual to each of said molds and registrable therewith, a plurality of pairs of separable neck mold sections, one pair surrounding each of said plungers, each of said neck mold sections being slidable into and out of open and closed positions adjacent the outermost extremity of said plungers, and adjacent the near face of said second block respectively, means for moving said first and second blocks into a face to face abutting engagement with said plungers registered with their opposed mold sections; switch means responsive to said engagement; means actuated by said switch means for injecting plastic into said blank mold to produce a blank; and means actuated by said switch for simultaneously introducing air into a blank in said blow mold to produce one of said articles; and means for aligning said first and second plungers with said second and first molds respectively on said first block after separation of said blocks.

2. Apparatus as claimed in claim 1 including means to enable opening of said separable neck sections outwardly of said second block after movement of said second block a predetermined distance from said first block.

3. Apparatus as claimed in claim 1 wherein said separable mold sections of said first block are supported by pins in said first block which pins are inclined towards one another.

4. Apparatus as claimed in claim 1 wherein said neck mold sections are supported by pins in said second block which pins converge inwardly towards a common plane.

5. Apparatus as claimed in claim 3 including spring means secured between said first block and said separable sections to normally urge said sections to project from the face of said first block opposed to said second block.

6. Apparatus as claimed in claim 1 including means for ejecting said article from said plungers subsequent to withdrawal of said plungers from said first block.

7. Apparatus as claimed in claim 1, including a housing, a shaft extending from said housing said second block being rotatably mounted thereupon, and means for rotating said block relative to said housing.

8. Apparatus as claimed in claim 4 including a movable base surrounding each of said plungers in sliding contact with said neck mold sections said base extending at least on one side beyond said second block, and second guide pins attached normally to said base and slidably engaged with corresponding channels in said second block and means limiting the outward movement of said base around said plunger.

9. Apparatus as claimed in claim 8 including a housing, said second block being mounted thereon, means for ejecting said blown article from said plunger subsequent to withdrawal from said first block comprising, a pin slidably extending through said housing, the forward end thereof being positioned to the side of said second block in line with the extension of said base, stop means positioned at the rear of said housing whereby on movement away of said second block from said first block the rear of said pin is arrested by said stop means and said extension of said movable base surrounding said plunger carrying said article strikes said pin for divergent opening of said neck mold sections and said movable base moves forward to exert pressure on the article on said plunger to effect its removal.

10. Apparatus as claimed in claim 9 wherein said second block is displaceable on said housing whereby said first and second fixed plungers register alternately with said first blow mold and second blank mold and the forward end of said pin is hingably movable with respect to said housing whereby on displacement of said block the extension of said movable base surrounding said plunger removed from said blank mold contacts the side of said hinged end of said pin, the latter moving outwards leaving unaffected the neck mold sections surrounding the blank removed from said blank mold.

References Cited by the Examiner
UNITED STATES PATENTS

| 1,475,032 | 11/23 | Shrum et al. | |
| 1,776,888 | 9/30 | Clark | 25—122 |
| 2,542,263 | 2/51 | Schultz. | |
| 2,789,312 | 4/57 | Borer | 18—5 |
| 2,864,124 | 12/58 | Strauss | 18—5 |
| 3,011,216 | 12/61 | Gussoni | 18—55 |
| 3,019,480 | 2/62 | Soubier | 18—5 |

WILLIAM J. STEPHENSON, *Primary Examiner.*
ROBERT F. WHITE, MICHAEL V. BRINDISI,
*Examiners.*